US007096458B2

(12) United States Patent
Bates et al.

(10) Patent No.: US 7,096,458 B2
(45) Date of Patent: Aug. 22, 2006

(54) METHOD AND APPARATUS TO CREATE AND COMPARE DEBUG SCENARIOS OF A COMPUTER PROCESS

(75) Inventors: Cary L. Bates, Olmsted, MN (US); Vadim Berestetsky, North York (CA)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 10/164,973

(22) Filed: Jun. 6, 2002

(65) Prior Publication Data

US 2003/0084430 A1 May 1, 2003

(30) Foreign Application Priority Data

Oct. 31, 2001 (CA) .................................. 2360650

(51) Int. Cl.
*G08F 9/44* (2006.01)
*H02H 3/05* (2006.01)

(52) U.S. Cl. ....................... 717/124; 717/100; 717/116; 717/129; 714/38

(58) Field of Classification Search ........ 717/124–135, 717/151–158; 714/26, 42, 45, 33–35, 37–38
See application file for complete search history.

(56) References Cited

U.S. PATENT DOCUMENTS

| 5,093,914 A | 3/1992 | Coplien et al. |
|---|---|---|
| 5,230,050 A * | 7/1993 | Iitsuka et al. ................ 717/145 |
| 5,513,317 A | 4/1996 | Borchardt et al. |
| 5,675,803 A | 10/1997 | Preisler et al. |
| 5,813,850 A | 9/1998 | Wimble |
| 5,903,718 A | 5/1999 | Marik |
| 5,922,079 A * | 7/1999 | Booth et al. ................... 714/26 |
| 5,933,639 A | 8/1999 | Meier et al. |
| 5,987,937 A | 11/1999 | Lee |
| 6,011,920 A | 1/2000 | Edwards et al. |
| 6,028,999 A | 2/2000 | Pazel |
| 6,067,639 A * | 5/2000 | Rodrigues et al. ............. 714/38 |
| 6,077,312 A * | 6/2000 | Bates et al. .................. 717/129 |
| 6,173,440 B1 | 1/2001 | Darty |
| 6,223,307 B1 | 4/2001 | Mastrangelo et al. |
| 6,381,735 B1 * | 4/2002 | Hunt ........................... 717/158 |
| 6,408,403 B1 * | 6/2002 | Rodrigues et al. ............. 714/38 |
| 6,587,967 B1 | 7/2003 | Bates et al. |

FOREIGN PATENT DOCUMENTS

| JP | 8249205 A | 9/1996 |
|---|---|---|
| JP | 2001014185 A | 1/2001 |

* cited by examiner

*Primary Examiner*—Antony Nguyen-Ba
(74) *Attorney, Agent, or Firm*—Duke W. Yee; Jeffrey S. LaBaw; Cathrine K. Kinslow (57) ABSTRACT

A computer program debugger is disclosed which stores previous programs which have been debugged and the debug parameters which were considered when debugging. When a new computer program is to be debugged, the new debugger is invoked and it automatically compares the executing program to be debugged with the previous programs. When one or more of the debug parameters are so similar that it can be said that the computer program undergoing debugging matches a previously stored computer program, a user is given options to display the matching programs, the modules, the functions, the lines, and the debug parameters and to exchange debug parameters between the programs which can be used to mod4 the either or any of the programs. The user is further given the option to store the current program undergoing debugging as a new program to be considered in matching the next program to be debugged.

21 Claims, 11 Drawing Sheets

METHOD AND APPARATUS TO CREATE AND COMPARE DEBUG SCENARIOS OF A COMPUTER PROCESS

TECHNICAL FIELD

This invention relates generally to the field of computer programs, and more particularly, relates to an algorithm which compares scenarios during a debug session of a computer process and matches the current scenario with a preexisting scenario or establishes a new scenario if no preexisting scenario matches.

BACKGROUND OF THE INVENTION

An important aspect of the design and development of a computer program is debugging which is intended to locate and identify errors in a computer program under development. Typically, a programmer uses another computer program commonly known as a "debugger" to debug a program under development. Conventional debuggers typically support two primary operations to assist a computer programmer. A first operation supported by conventional debuggers is a step function which permits a computer programmer to process instructions, also known as statements, one at a time in a computer program and see the results of each instruction upon completion. While the step operation provides a programmer with a large amount of information about a program during its execution, stepping through hundreds or thousands of program instructions is tedious and time consuming. The programmer may be required to step through many program instructions that are already known to be error-free before a set of instructions to be analyzed are executed.

To address this difficulty, a second operation supported by conventional debuggers is the breakpoint operation which permits a computer programmer to identify a breakpoint as a precise instruction at which execution of a computer program is halted. As a computer program is executed by a debugger, the program executes in a normal fashion until a breakpoint is reached, the program stops execution and the debugger displays the results of the computer program to the programmer for analysis.

Step operations and breakpoints are typically used together to simplify the debugging process. Specifically, a user during a common debugging operation will set a breakpoint at the beginning of a desired set of instructions to be analyzed and then begin execution of the program undergoing debugging. Execution halts at a breakpoint and the programmer then steps through the desired set of instructions line-by-line using the step operation. Consequently, a programmer is able to quickly isolate and analyze a particular set of instructions without having to step through irrelevant portions of a computer program.

Most breakpoints supported by conventional debuggers are unconditional meaning that once such a breakpoint is reached, execution of the program is always halted. Some debuggers, however, also support the use of conditional breakpoints which only halt execution of a program when a variable used by the program is set to a predetermined value at the time such a breakpoint is reached. One significant drawback to conventional breakpoints results from the fact that some instructions in a computer program are executed fairly often for different purposes and may result in many needless stoppages before a desired stoppage is encountered. This problem is especially pronounced in object-oriented programming (OOP) and other highly modular languages where a single general purpose portion of a computer program may be executed in many different situations for different purposes.

With an object-oriented programming language, for example, a program is constructed from a number of "objects," each of which includes data and/or one or more sets of instructions, often referred to as routines or methods that define specific operations that can be performed on the data. A large number of objects may be used to build a computer program with each object interacting with other objects in the computer program to perform desired operations. When one object invokes a particular routine in another object, the former object is often said to be calling the routine in the latter object. Some general purpose objects in a computer program may support basic operations, e.g., displaying information to a user, printing information on a printer, storing or retrieving information from a database, etc. Particularly, these generic type of objects are called by many different objects so that placing a conventional breakpoint in a routine of one of these common generic objects will result in hundreds of unwanted stoppages prior to occurrence of a desired stoppage. Thus, context sensitive breakpoints can be set in certain debuggers to retrieve the sequence of routines in the computer program that are called just prior to reaching the breakpoint, such as in U.S. Pat. No. 6,077,312 entitled "Apparatus, Program Product and Method of Debugging Utilizing a Context Sensitive Breakpoint" issued Jun. 20, 2000, commonly owned by the assignee and herein incorporated by reference in its entirety. Context sensitive breakpoints locate the specific calls in other objects that relate to the desired stoppage in a particular object. This eliminates the extremely time consuming and tedious task of setting each breakpoint and eliminates the risk that not all relevant calls are located so not all desired circumstances for inducing stoppages may be recognized during debugging.

But, setting breakpoints and halting execution of a program undergoing debugging is still onerous. Significant time is spent going through the breakpoints, whether the breakpoints are general or are context specific, as above. Merely watching breakpoints, moreover, does not solve the problem of determining the dynamics of an executing program in which variables and other expressions stored in a memory location may constantly change. These changing variables, moreover, may have either a direct or an indirect impact on other variables and other computer expressions.

As an example, if a user sets a breakpoint at line 12 in procedure A, she/he almost always sets a breakpoint at line 40 in some procedure B also because this is where some particular data she/he is interested in is processed. In fact, this occurrence is so common that one of the most popular features of debuggers today is to allow users to save their debug environment and restore it the next time they start debugging. While this is helpful to those users who start debugging one problem and have to stop and resume debugging later, it seldom helps the user to debug a similar problem the next time and the user must establish the same breakpoints and program variable monitors again. How a user got to a particular environment is not at all obvious; there may be different codes acting on different structures. Once a user sets breakpoints, moreover, the breakpoints must be managed meaningfully.

In addition, contemporary debuggers usually associate an environment instance with a specific program. While this works in some situations, it is of little help in others, especially where the same objects are called in other programs. Similarly, if a user would like to debug a specific process or job on a target machine, but doesn't know the program name on that machine, it may be difficult, if not impossible, to restore a debugging environment from the previous debug session.

There is thus a significant need in the industry to help programmers establish important breakpoint and monitor scenarios and to be able to recall these scenarios across different programs that are debugged.

SUMMARY OF THE INVENTION

These needs and others that will become apparent to one skilled in the art are satisfied by a matching algorithm which determines what restorable debug entities comprise a scenario of a computer program, assigns an individual weight to each of the restorable debug entities; and then, given any two scenarios, comparing the restorable debug entities of each scenario to determine the extent of similarity between the scenarios. If the scenarios are significantly different, the algorithm will establish and store a new scenario. It is further contemplated that the algorithm recognizes that a previous scenario has been stored. The previous scenario may then be restored. The current scenario may be modified by incorporating the debug entities of the previous scenario; or the previous scenario may be modified by incorporating the debug entities of the existing scenario.

The restorable debug entities may comprise at least one breakpoint and/or a location of the at least one breakpoint in any two scenarios. The breakpoints may be either a line and/or an exit breakpoint. Another restorable debug entity may be an operation and/or its location in any two scenarios. Yet other restorable debug entities may comprise one or more expressions and/or a location and/or a value of the expressions in any two scenarios.

It is further envisioned that the invention is a matching algorithm, comprising: determining that a scenario may comprise a plurality of restorable debug entities, each of which may further comprise one or more of the following: at least one breakpoint and/or a location of the at least one breakpoint, at least one operation and/or a location of the at least one operation, at least one expression and/or a location and/or a value of the at least one expression; assigning an individual weight to each of the restorable debug entities; given a current scenario and at least one previous scenario, comparing the restorable debug entities of the current scenario to the restorable debug entities of at least one previous scenario to determine the extent of similarity between the scenarios; establishing and storing the current scenario if the scenarios are different; recognizing that a previous scenario has been stored; restoring the previous scenario; and modifying the current scenario by incorporating the debug entities of the previous scenario and/or modifying the previous scenario by incorporating the debug entities of the current scenario.

The invention is also a method of debugging a computer program, comprising the steps of: monitoring a number of parameters that can be used to debug a computer program; comparing at least one environment in which at least one of the parameters are referenced during the execution of the program; determining that the at least one environment is similar to an executing portion of the computer program because of a similarity of at least one of the parameters; and retrieving and displaying the at least one similar environment and the at least one and other parameters, if any, of the similar environment. The step of determining may further comprise weighting each of the parameters; summing each of the weighted parameters; and then determining if the sum of the weighted parameters is greater than or equal to a threshold value of similarity. The method may also include the steps of retrieving and displaying all of the similar environments and parameters of the similar environments wherein the parameters are similar beyond the threshold value of similarity. The computer program and/or the environment may be modified as a result of the step of comparison. The method may also store that executing portion of the computer program as a new environment if the executing portion of the program is less than the threshold value of similarity.

The invention is also an article of manufacture, comprising a data storage medium tangibly embodying a program of machine readable instructions executable by an electronic processing apparatus to perform method steps for operating an electronic processing apparatus, said method steps comprising the steps of: initiating a user interface to invoke execution of a computer program undergoing debugging; determining a plurality of debug entities to monitor during the execution of the computer program; monitoring the plurality of debug entities during execution of the computer program; recalling a plurality of scenarios having some of the same plurality of debug entities as those of the executing computer program; comparing the debug entities of the plurality of scenarios with the plurality of debug entities of the executing computer program; determining if any of the plurality of scenarios match the executing program based on the similarity of the debug entities; and displaying those scenarios and debug entities of the displayed scenarios that match the debug entities of the executing computer program. The article of manufacture may further cause the executing computer program to be modified. The executing computer program may be stored as a new scenario if no matching scenarios exist.

The invention is also an article of manufacture, comprising a data storage medium tangibly embodying a program of machine readable instructions executable by an electronic processing apparatus, comprising: a plurality of potentially matching scenarios which, when compared to a computer program undergoing debugging, may indicate that the computer program is equal to or greater than a threshold value of similarity to at least one of the matching scenarios.

The invention is also a computer program debugger, comprising a means to call a computer program; a means to set a plurality of debug parameters to monitor during execution of the computer program; a means to store a plurality of scenarios of previously executed computer programs, each of said scenarios having at least one debug parameter; a means to compare the debug parameters of the computer program during execution with the debug parameters of the previously executed computer programs; a means to ascertain whether the computer program is similar to any of the previously executed computer programs; a means to display the previously executed computer programs that are similar to the computer program; a means to modify the computer program in accordance with any of the similar previously executed computer programs; and a means to store the computer program and its debug parameters.

BRIEF DESCRIPTION OF THE DRAWING

The novel features believed characteristic of the invention are set forth in the claims. The invention itself, however, as well as a preferred mode of use, objects and advantages thereof, will best be understood by reference to the following detailed description of an illustrative embodiment when read in conjunction with the accompanying Drawing, wherein:

DETAILED DESCRIPTION OF THE INVENTION

Figure 1:
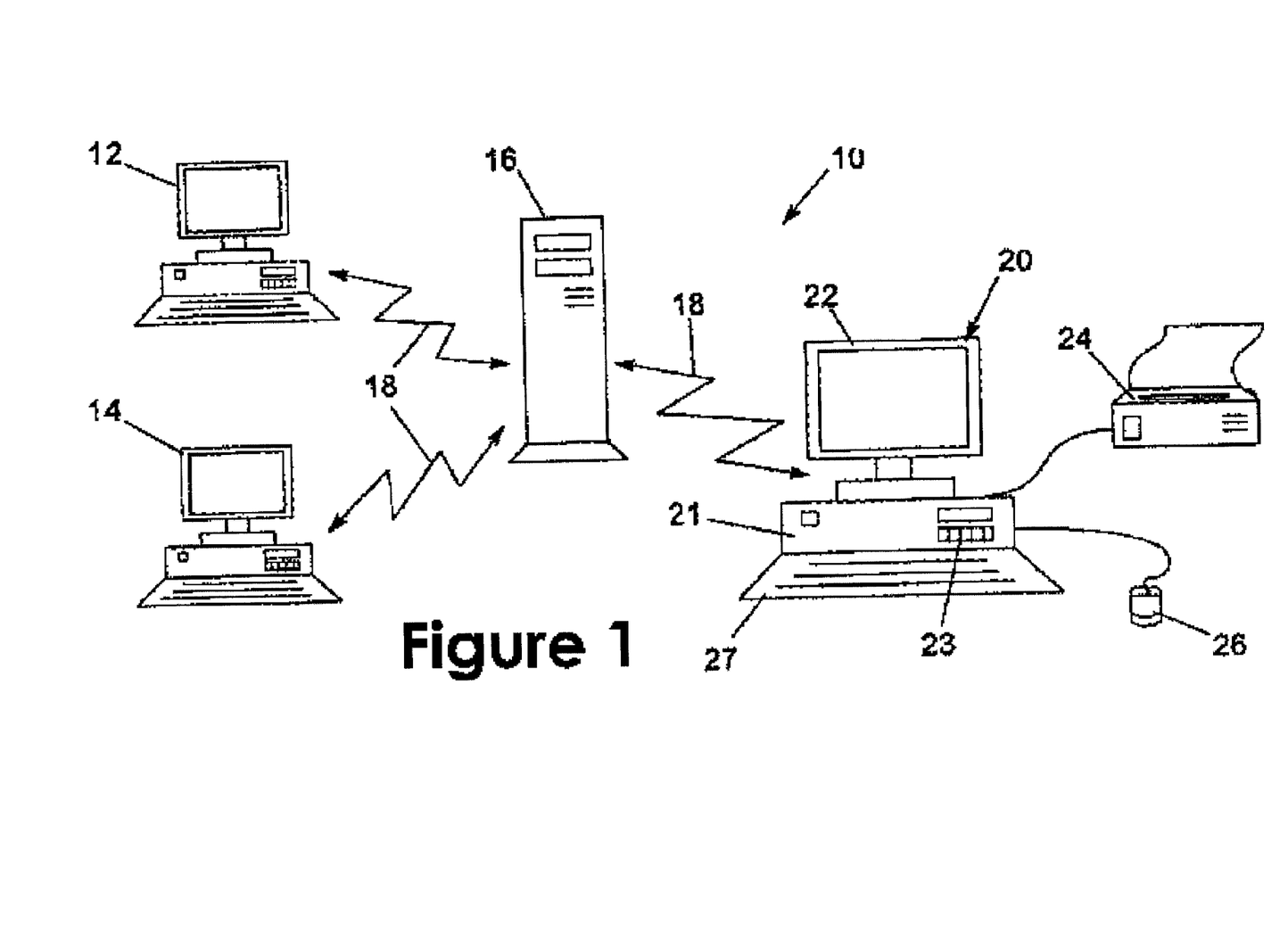
FIG. 1 is a high-level block diagram of a server computer system capable of implementing the preferred embodiment of the invention.

Referring to the Drawing, wherein like numbers denote like parts throughout the several views, FIG. 1 illustrates a computer system 10 consistent with the invention. Computer system 10 is illustrated as a networked computer system including one or more client computers 12, 14 and 20, e.g., desktop or PC-based computers, workstations, etc., coupled to server 16, which could also be a PC-based server, a minicomputer, a midrange computer, a mainframe computer, etc., through a network 18. Network 18 may represent practically any type of networked interconnection, including but not limited to local-area, wide-area, wireless, and public networks such as the Internet. Any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices, e.g., a mouse 26 and keyboard 27, among others. Server computer 16 may be similarly configured, albeit typically with greater processing performance and storage capacity, as is well known in the art.

Figure 2:
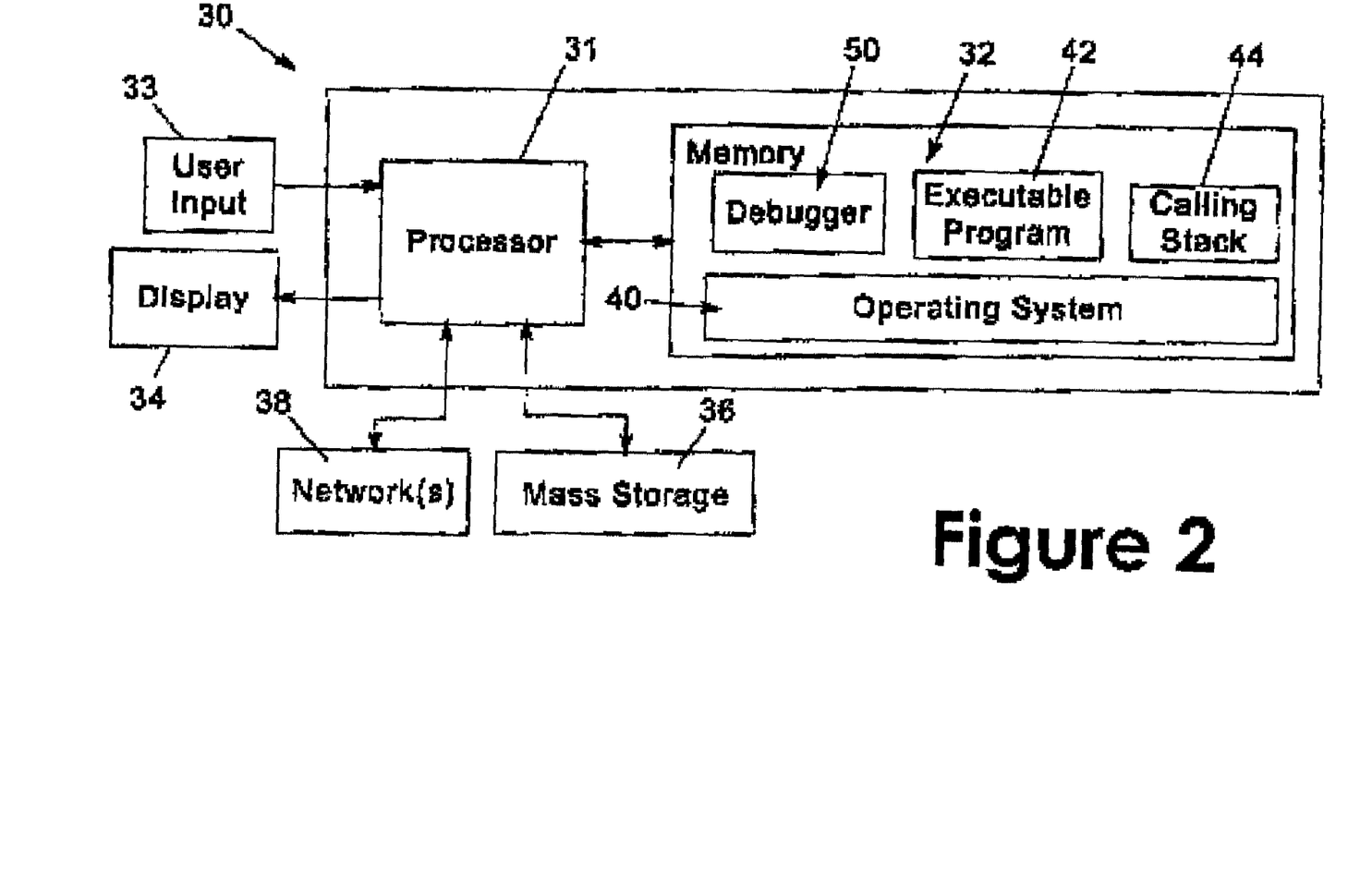
FIG. 2 is a simplified representation of a computer network capable of implementing the preferred embodiment of the invention.

FIG. 2 illustrates in another way an exemplary hardware and software environment may be configured for an apparatus 30 consistent with the invention. For the purposes of the invention, apparatus 30 may represent practically any type of computer, computer system or other programmable electronic device, including a client computer, e.g., similar to computers 12, 14 and 20 of FIG. 1, a server computer, e.g., similar to server 16 of FIG. 1, a portable computer, an embedded controller, etc. Apparatus 30 may be coupled in a network as shown in FIG. 1, or may be a stand-alone device in the alternative. Apparatus 30 will hereinafter also be referred to as a computer although it should be appreciated the term "apparatus" may also include other suitable programmable electronic devices consistent with the invention.

Computer 30 typically includes at least one processor 31 coupled to a memory 32. Processor 31 may represent one or more processors or microprocessors, and memory 32 may represent the random access memory (RAM) devices comprising the main storage of computer 30, as well as any supplemental levels of memory, e.g., cache memories, non-volatile or backup memories, programmable or flash memories, read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33, e.g., a keyboard, a mouse, a trackball, a joystick, a touchpad, and/or a microphone, among others, and a display 34 such as a CRT monitor, an LCD display panel, and/or a speaker, among others. It should be appreciated, however, that with some implementations of computer 30, e.g., some server implementations, direct user input and output may not be supported by the computer.

For additional storage, computer 30 may also include one or more mass storage devices 36, e.g., a floppy or other removable disk drive, a hard disk drive, a direct access storage device (DASD), an optical drive e.g., a CD drive, a DVD drive, etc., and/or a tape drive, among others. Furthermore, computer 30 may include an interface with one or more networks 38, e.g., a LAN, a WAN, a wireless network, and/or the Internet, among others, to permit the communication of information with other computers coupled to the network. It should be appreciated that computer 30 typically includes suitable analog and/or digital interfaces between processor 31 and each of components 32, 33, 34, 36 and 38, as is well known in the art.

Computer 30 operates under the control of an operating system 40, and executes various computer software applications, components, programs, objects, modules, etc., such as an executable program 42, a calling stack 44, a debugger 50, among others. The debugger software application 50 is resident in memory 32 for the purpose of debugging one or more executable computer programs, e.g., executable program 42. A calling stack 44 associated with executable program 42 is utilized by operating system 40 during the execution of program 42. These and other various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as computer programs or simply programs. The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention.

While the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks, e.g., CD-ROM's, DVD's, etc., among others, and transmission type media such as digital and analog communication links. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. The exemplary environments illustrated in FIGS. 1 and 2 are not intended to limit the present invention. Indeed, those skilled in the art will recognize that other alternative hardware and/or software environments may be used without departing from the scope of the invention.

Routines, often referred to as methods, procedures, and functions, are typically sequences of instructions or statements in a computer program that may be invoked to perform predetermined operations on a computer. The calling history for a computer program is typically maintained by an operating system using a data structure such as a calling stack that maintains information regarding the sequence of routines that are called during the execution of the computer program. A calling stack is a first in-first out (FIFO) data structure. In response to a routine call from a first routine to a second routine, an operating system will generally "push" onto the top of the calling stack an entry that identifies both the first routine, as well as the specific instruction or statement in that routine from which the routine call was made or, alternatively, the instruction or statement in that routine to which control should be returned upon completion of the second routine. The second routine is then executed, and if that routine calls an additional routine, an entry relating to that routine call is also added to the stack. As routines terminate in execution, entries from the calling stack are then "popped" from the top of the stack and the information therein analyzed to determine the routine and instruction therein where control should be returned.

In accordance with features of the invention, as will be described, greater freedom and flexibility is granted to the computer programmer so she/he can create, use, and store debug scenarios to recognize additional breakpoints and monitored variables, which can be further suggested to the user. Similar to programs that look at the first few characters typed in a word and automatically try to complete the word, in accordance with features of the invention, the algorithm considers the current scenario of a breakpoint and compares it to past scenarios which have been stored. If the similarity between the current scenario and a previously stored scenario exceeds a user-defined threshold, the debugger quickly and efficiently locates and restores settings such as breakpoints and monitored variables. This process thus saves the user significant time when establishing these parameters in a new program and further reduces debug time by ensuring the user has not forgotten that critical breakpoint.

The invention further recognizes and saves debug scenarios associated with the various source code units in a database. It tracks the breakpoints, step locations, and states of variables each time a user debugs a program and then implements a weighting algorithm to determine if the current debug scenario is a commonplace occurrence or is a new phenomena. When the user enters a debug session and adds programs to debug, and adds breakpoints to the programs, the debugger in accordance with features of the invention looks at scenarios to determine which ones best match and, at the user's request, displays information relating to the best matching scenarios. The user then may select one of them to assist in the current debug session. Once the user selects one of the previously stored matching scenarios, all breakpoints and monitored program variables for the scenario may be restored, as in Canadian patent application serial number 2,347,647 entitled *Storing and Restoring Snapshots of a Computer Process* by Vadim Berestetsky, Cary Bates, Paul Day, and John Santosuosso, filed May 15, 2001, which is hereby incorporated by reference it its entirety.

Figure 3:
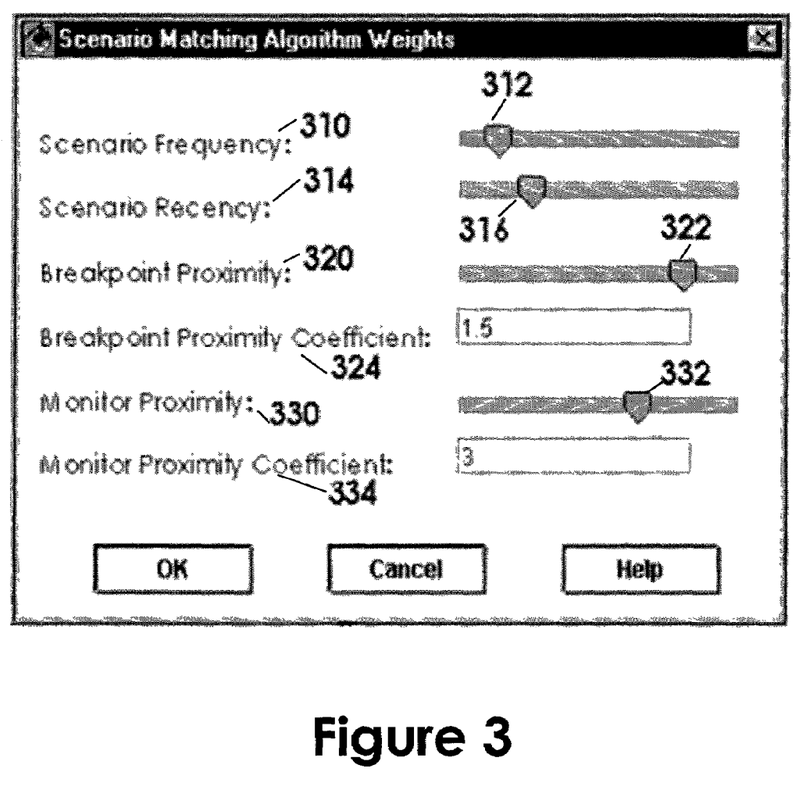
FIG. 3 is a representation of a graphical user interface of how to establish weights of various factors in a debugging scenario in accordance with an embodiment of the invention.

To understand how the matching of debug scenarios may be accomplished, consider FIG. 3. FIG. 3 is an example of graphical user interface that can be used to determine the factors that might comprise the scenario of interest. Given a debug program interrupted at a breakpoint, a scenario may comprise, for example, breakpoints, step locations, monitored and changed variables, and set variables including their values and locations and step locations. This inclusion of what comprises a scenario is not intended to be limitative, but only illustrative. One of ordinary skill in the art will realize that certain parameters are unique or of more or less interest in particular programs. In an integrated development environment (IDE), for instance, macro variables or changed source code may be other variables tracked during a debug session.

Each of the parameters comprising a defined scenario, moreover, may contribute a different weight to a total match score depending upon the debug program, the program undergoing debugging, the previously stored scenarios, etc. For example, a common object call or other program statement stepped through in many scenario. may contribute less weight to an overall comparison between two scenarios than if a. breakpoint is set on the seine line in both scenarios. Similarly, setting a variable to to same value at approximately the same location in the program would also contribute more weight than simply monitoring the variable. It should be understood that the actual value of these weights is not critical and the algorithm can be tuned by the user or debugger provided. Given this background, the reader is directed to FIG. 3 which illustrates how a user can set three parameters to be compared in two programs undergoing debugging. The first line 310 represents the scenario frequency,i.e., how many times the scenario is found to match in a period of time. If the user wishes to assign a higher score to a scenario that is a more common occurrence in a program undergoing debugging, the tab 312 may be slid further to the right using a mouse or other visual input device. In addition, scenario recency 314 represents how recently the scenario was used. Recently used and heavily used scenarios may initially be given a smaller score by sliding tab 316 to the loft because these scenarios may be very common scenarios like certain object calls or, on the other hand, a higher score may be assigned by sliding tab 316 to the right because the scenario may have a slight advantage in that these are more likely to be the ones that the user wants.

A second parameter may be the breakpoint proximity 320. If the breakpoint in the program undergoing debugging is near/far to the breakpoint in the saved scenario, the proximity may be given a higher weight by sliding tab 322 to the right. Similarly, even if a breakpoint is not set at the same location some weight would be given if the breakpoint is set close to the original location. The closer the breakpoints is to the original location, the more weight the breakpoint proximity would be given toward the total matching score. The further away, the less weight would be given. Again, distance of a program statement or a line to a breakpoint is an adjustable parameter that could be configured via the proximity coefficient 324 but the weighting value would most likely erode, perhaps even exponentially, as the distance increases, and the user may define that if the breakpoints are more than five lines apart little or no weight would be given towards the total match score. Another parameter that may be watched and compared during a debug session is a monitored expression 330. Broadly, a monitored expression is a computer language expression and the location at which the expression is evaluated. If the monitored expression is in a similar location as in a stored scenario, that proximity can be set by sliding tab 332. The weighting factor 324 of the monitor proximity coefficient can also be set in box 334. Thus, matching up breakpoints and variables monitored as described above may be the primary contributor to the match score, other parameters may be set with smaller weighting factors.

Figure 4:
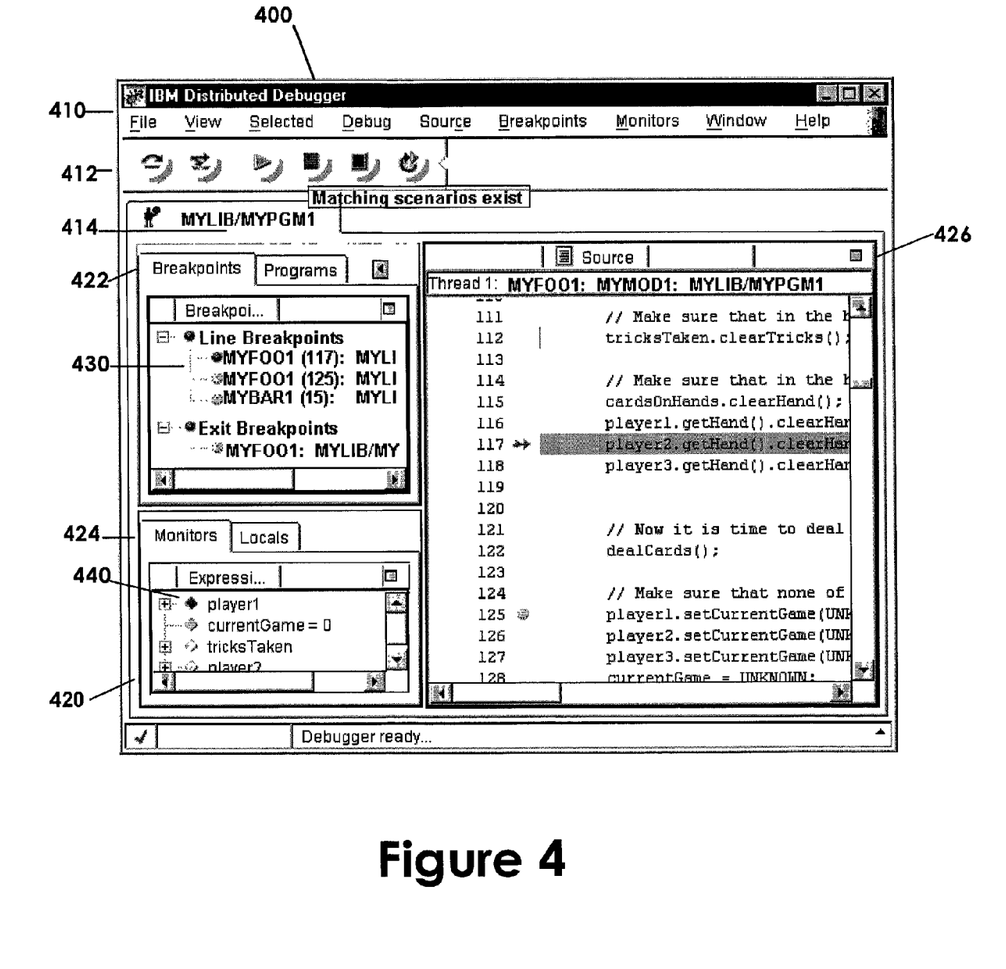
FIG. 4 is a representation of a graphical user interface illustrating potentially matching scenarios in accordance with an embodiment of the invention.

FIG. 4 is an illustration of a graphical user interface that may appear during a debug session implementing features of the invention. While the user interface shown in this and all other examples of user interfaces is a graphical one capable of display on a computer monitor or a flat panel display, etc. it is fully intended that the user interfaces disclosed herein may cover any visual, audible, or tactile method and device with which to communicate and interact with a user. A screen 400 is displayed having a toolbars 410 and 412 representative of the operating system and the debug program, respectively. The program undergoing debug is set forth in the tab 414 of the larger window 420 encompassing three smaller windows 422, 424, and 426. Window 426 shows the actual lines of code of the program undergoing debugging. Window 422 has two tabs labeled Breakpoints and Programs of which the Breakpoints is selected by the darkened circle 430, and as can be seen in window 426, the breakpoint at line 117 is highlighted. Window 424 illustrates has two tabs: Monitors and Locals of which Monitors is selected. The state of variable "player1" 440 is selected to indicate is the monitored expression in this case, i.e., perhaps every time a breakpoint occurs, the value of "player1" will be evaluated. Locals displays the local variables that may be scoped locally to a procedure, such as in JAVA or C++.

In accordance with features of the invention, the state of the variables of window 424 at the breakpoints shown in window 422 are monitored through the program instructions shown in window 426 as the program undergoes debugging. These parameters are given weighting factors as described with respect to FIG. 3 and are compared against existing scenarios. If the current scenario as shown in FIG. 4 is found to be so dissimilar as to be below a threshold value to any existing scenario then a new scenario is created.

Figure 5:
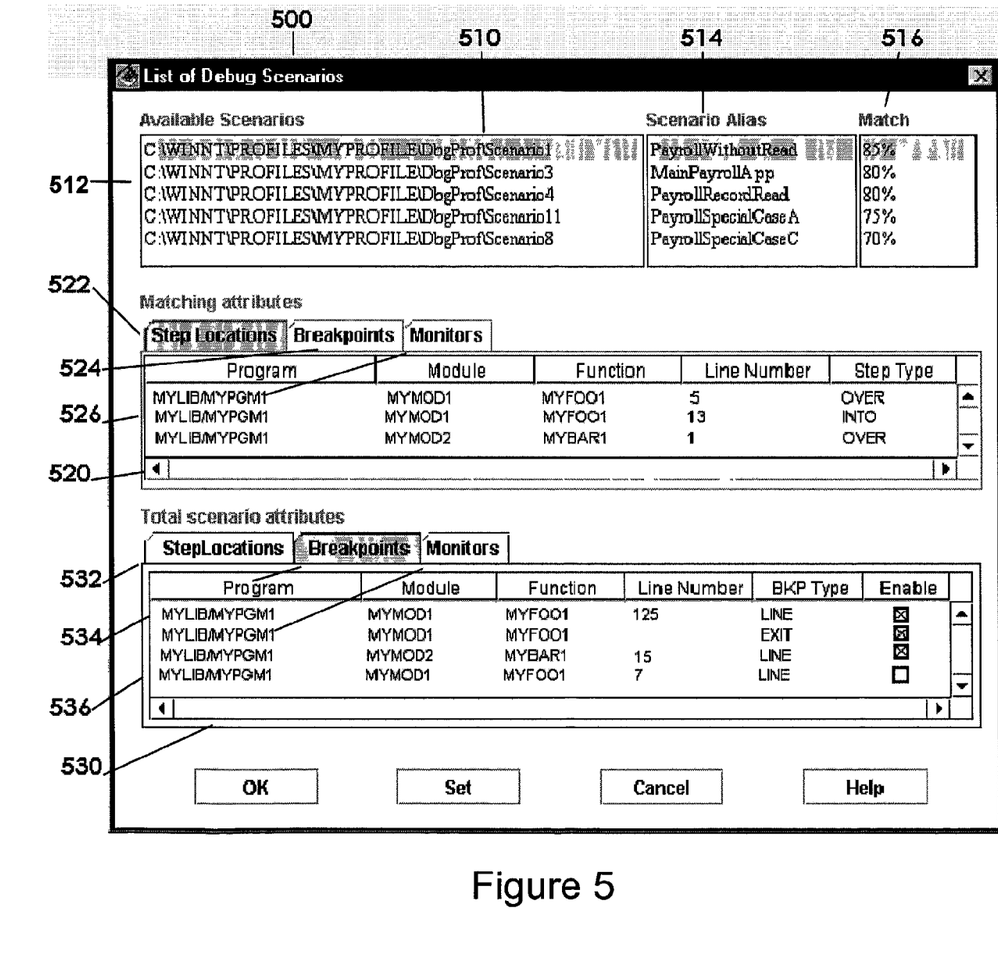
FIG. 5 is a representation of a graphical user interface of potentially matching scenarios and their attributes. It is suggested that FIG. 5 be printed on the face of the patent.

In comparing two debug sessions for similar scenarios a total possible matching score is computed and compared to an actual score. If the actual score is some threshold percentage of the total possible score, say for example, 75%, then the preexisting stored scenario is said to match the current scenario. At this point if desired the user should be able to bring up a window that will list and explain all matching scenarios. For example, clicking on an appropriate toolbar button in the debug program may invoke list of matching scenarios and their complete descriptions. In the case that more than one stored scenario matches the current scenario by more than the threshold percentage, the previously stored scenario that has the best match to the scenario undergoing debug may be selected. Such a listing of matching scenarios is presented in an illustration of a graphical user interface 500 as shown in FIG. 5. Window 510 lists each preexisting scenario which may have a simple name 512 and a more descriptive alias 514. The matching score 516 may also be displayed. When displayed to the user the scenarios could be ordered by highest score. Scenarios with a matching score of zero or below a threshold or other matching value need not be listed.

In order to help the user choose a particular scenario, the user interface 500 of FIG. 5 will point out which scenario attributes match the actions taken by the user so far. Each scenario might be saved as a file in the directory where user's profiles reside. For a previously stored scenario highlighted in window 510, C:\WINNT\PROFILES\MYPROFILE\DbgProfScenario1, the attributes may be shown in window 520. For example, window 520 has the step locations 522 shown but a user may also be able to consider the breakpoints or the monitors of the previously stored scenario by selected the appropriate tab 524 and 526, respectively. Details of the step locations may be additionally displayed, e.g., the module of the compiled code, a function within the module, the line number and step type within the function, etc. One of skill in the art will realize that other details may be displayed depending, of course, on the debug program, the program undergoing debugging, the objects involved, etc.

Window 530 of FIG. 5 provides a means by which the user can access all recorded attributes of the current scenario. Window 530 has three tabs indicating the user may access each step location 532, each breakpoint 534, and each monitored variable 536 of the attributes of the debugged program. In this fashion, the attributes of the debugged program corresponding to the matching scenarios may be displayed to the user.

Figure 6:
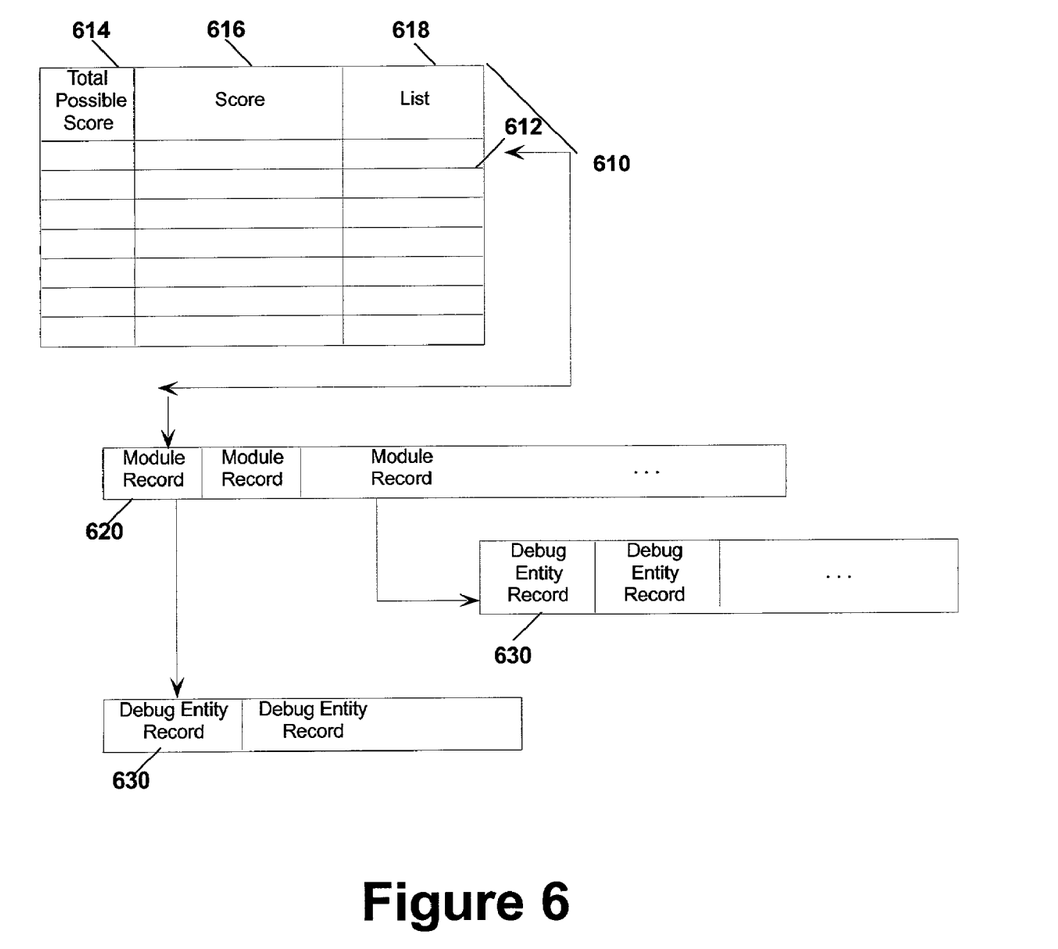
FIG. 6 represents a data structure of scenarios which match a current scenario in accordance with an embodiment of the invention.

FIG. 6 is an example of a data structure that can be used to store the matching scenarios. The first data structure 610 may comprise a number of scenarios 612, each of which has a total possible matching score matching in column 614, the actual score in column 616, and a list of module records in column 618. Each module record 620 may have a number of debug entity records 630, each of which provide details of which may be displayed in the user interface of FIG. 5.

Figure 7:
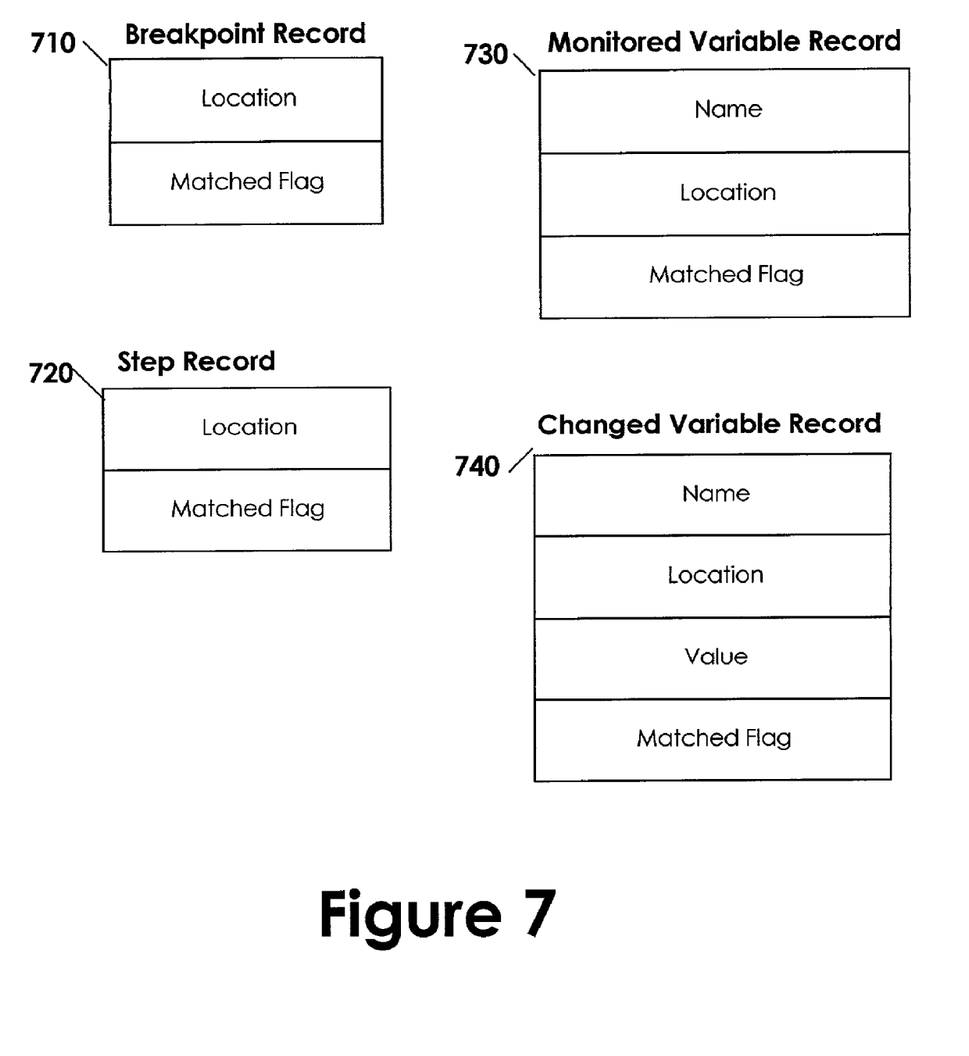
FIG. 7 represents a data structure of debug entity records in which various attributes match the current debug scenario in accordance with an embodiment of the invention.

In fact, FIG. 7 provides more details of the data structure of debug entity records 630 which may include the breakpoint record 710 recording the location of the breakpoint in the matched scenario. The matched flag of the each breakpoint indicates whether the breakpoint of the previously stored scenario matches the current scenario. This is a convenient technique to avoid scoring the same debug entity more than once during a session. The step record 720 may indicate the location of the step function and the matched flag. The monitored variable record 730 could contain the name of the variable, the location, e.g., either the line number or the memory location, and the matched flag of the variables. If the variable changes, moreover, the changed variable record 740 could contain location and the value of the changed variable.

Figure 8:
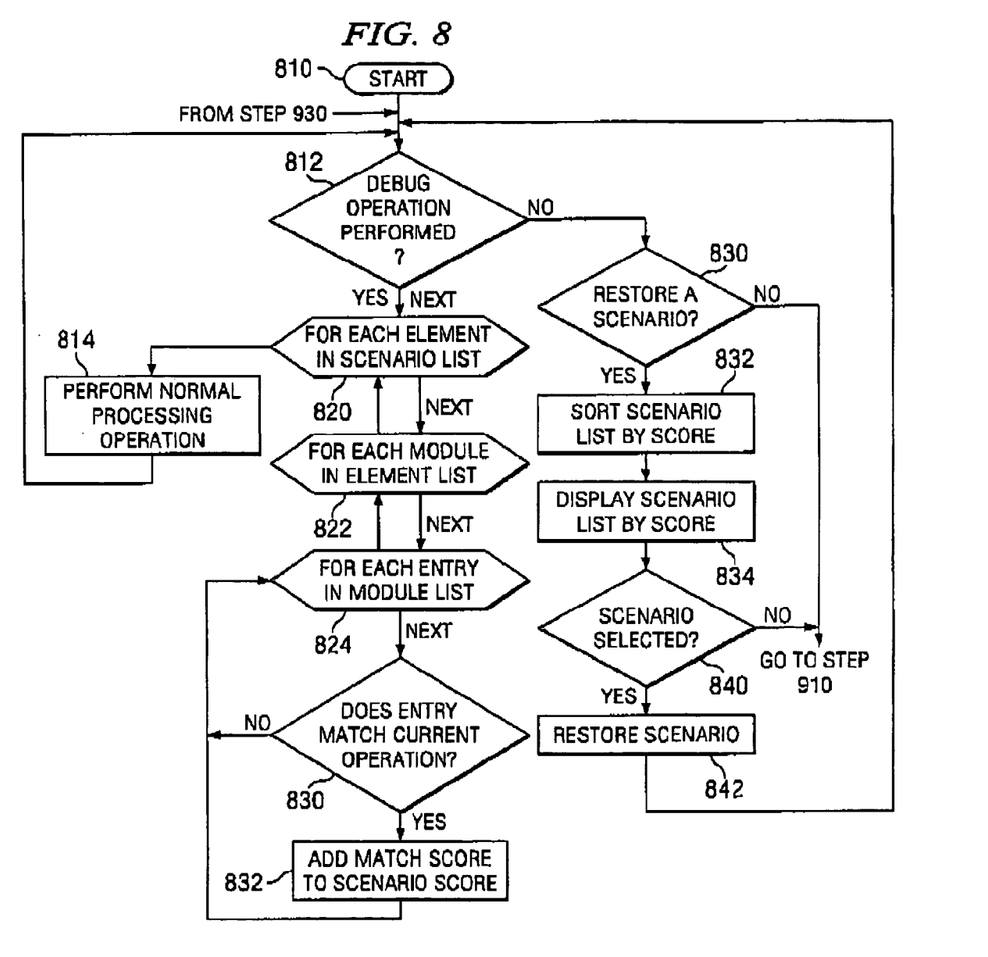
FIGS. 8–11 are flowcharts illustrating the program flow of the method to create and/or match a new debug scenario with a new or preexisting scenario in accordance with an embodiment of the invention.

The process by which a debug program can implement features of the invention begins with the flow chart of FIG. 8. At step 810, the process starts and the first inquiry at step 812 is whether a debug operation is to be performed on a program. If the response is yes, then for each element in the scenario list at step 820, normal debug processing occurs at step 814, meaning that the breakpoints are set, the steps are monitored, it is determined if the program undergoing debugging matches any preexisting scenarios and then the operation is performed. For each debug entity record 630, step 824, of each module record 620, step 822, in each scenario 612, step 820, the process determines if there is a match to the current program undergoing debugging, as in step 830. If the match score is greater than some threshold value or percentage, then at step 832, the match score is added to column 616 of FIG. 6.

If, however, a debug operation is not performed at step 812, then the process inquires at step 830, if the task is to restore a scenario. If the answer is yes, then the scenario list 610 may be sorted by score in step 832 and may be displayed in step 834. If the user or the program then selects a scenario as matching in step 840, the process then restores the scenario in step 842. If, however, either the user does not wish to restore a scenario at step 830 or a scenario is not selected at step 840, the process is continued onto the flow chart of FIG. 9.

Figure 9:
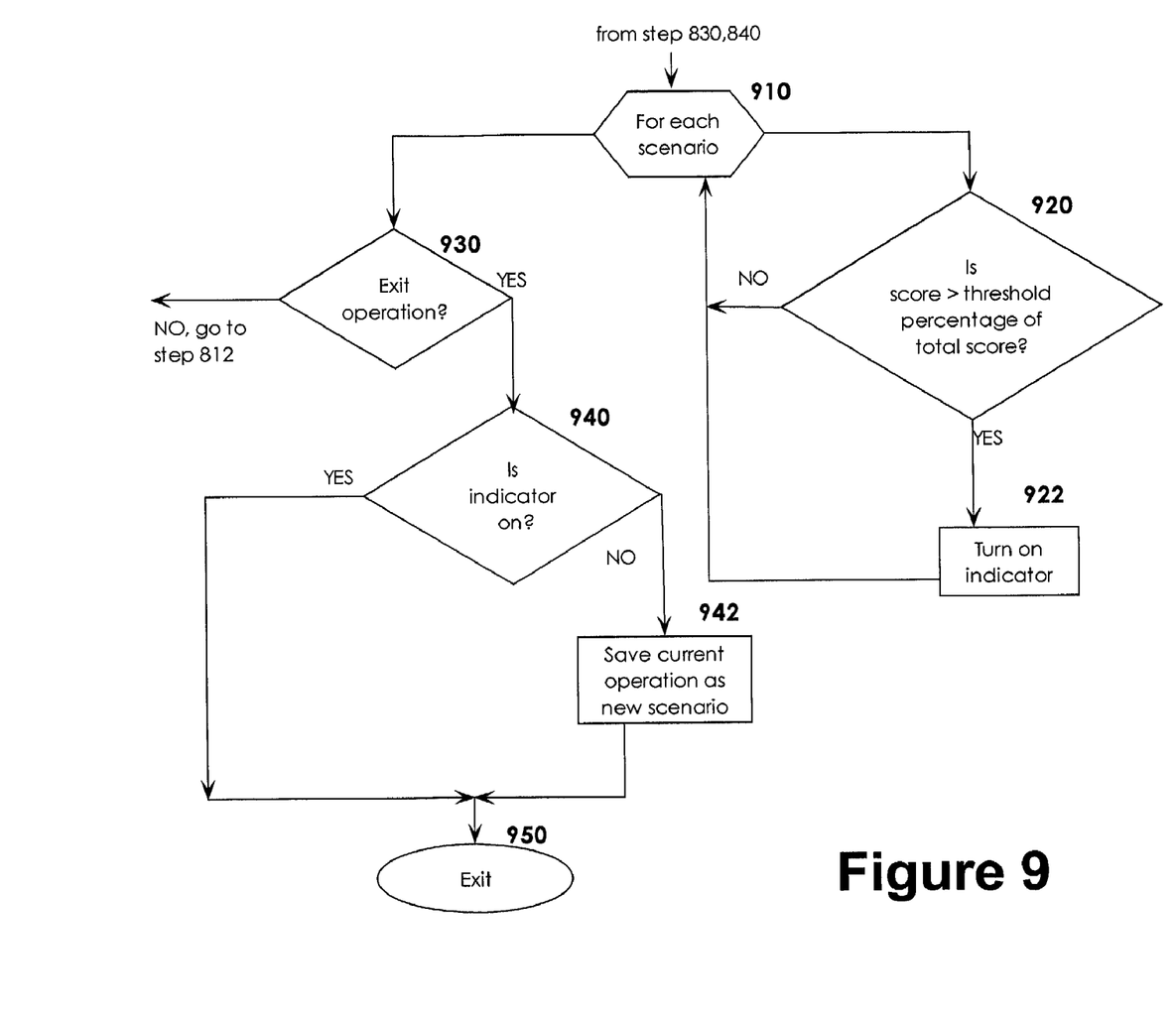

FIG. 9 shows additional steps from a debug process incorporating features of the invention. At step 830 and/or at step 840 from FIG. 8 wherein the user has decided he/she does not wish to restore or select a scenario, the process begins at step 910 for each of the scenarios listed in the data structure 610 of FIG. 6, and determines in step 920 if the score is above or equal to some predetermined threshold percentage of the total score. If so, then an indicator is turned on in step 922. An indicator may be, for instance, a toolbar button changing from green to yellow or red depending on the percentage of the match in the user interface of FIG. 5 or a scenario being highlighted, etc. If, however, the user does not wish to match any scenario, then in step 930, the process inquires whether the user wishes to exit the debug program. If not, the process returns to step 812 of FIG. 8. If, however, the user does wish to exit the debug operation in step 930, the process checks in step 940 to see if an indicator is on meaning that a preexisting scenario has been found to have a matched percentage greater than or equal to the threshold, and the program exits. If, however, the indicator is not on, it means that there is no scenario that matches as well as or better than the current scenario and the current scenario in the debugging program is saved in step 942 as a new scenario. The process then computes and saves the total possible matching score, by, for example, assuming that everything matches and totaling the individual matches.

Figure 10:
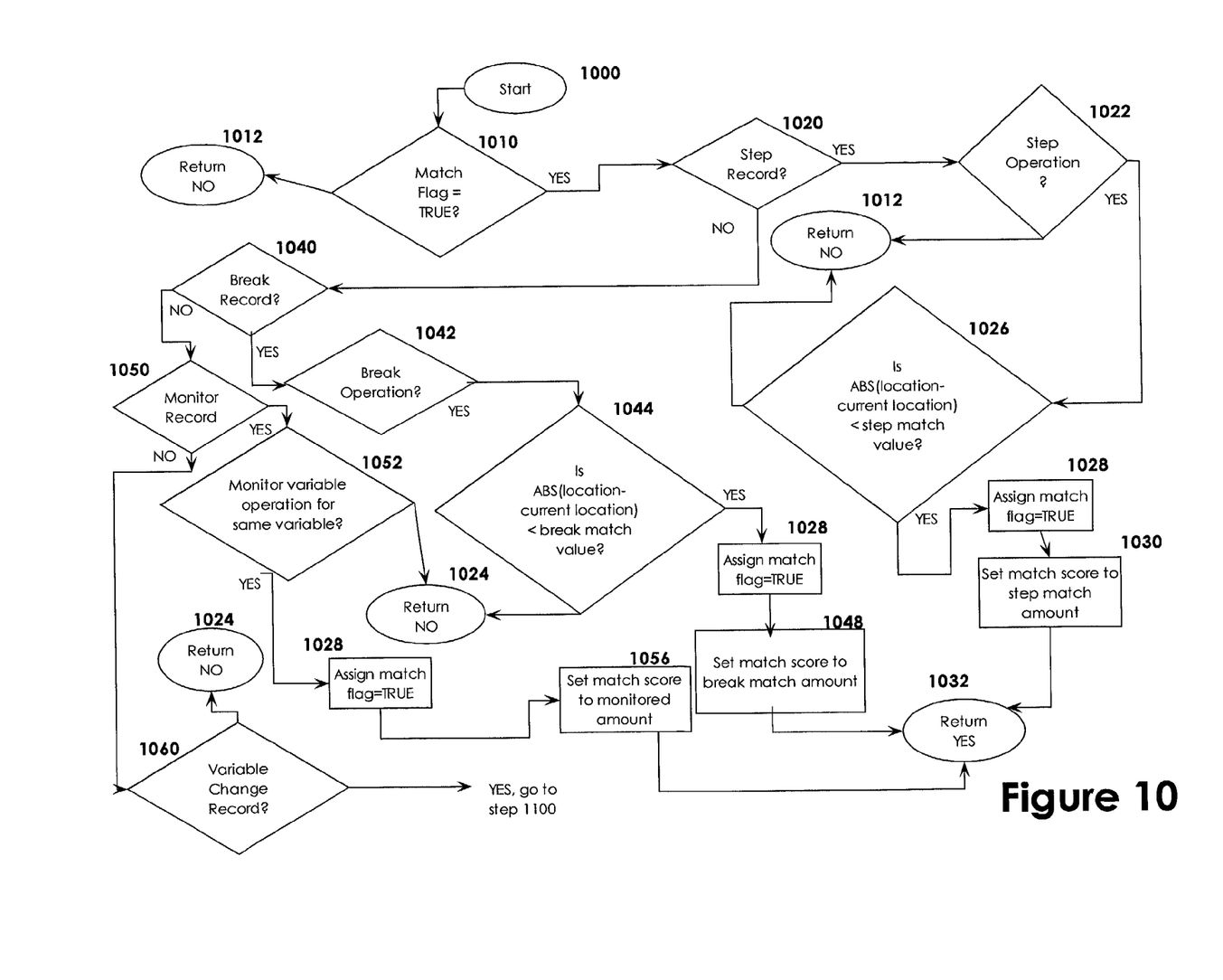

FIG. 10 illustrates the possible process flow of determining if a previously stored scenario listed in the data structure 610 of FIG. 6 matches the current scenario of the program undergoing debugging. In step 1000, the process begins and determines if the match flag is equal to TRUE in step 1010. If the match flag is equal to TRUE, then in step 1020, the user is asked if he/she wishes to step through the record of scenarios that match. If so, then in step 1022, the process inquires if the current operation is a step operation. If so, then in step 1026, the process determines if the absolute value of the distance between the step location and the current value location is less than some step match value, in other words, are the locations close enough in proximity to match? If yes, then in step 1028, the match flag is set to TRUE, and the match score for the step match is calculated using the distance and the weighting factor allocated to the step record function.

If the step record does not match, then in step 1040, the breakpoint record is examined. In step 1042, the process queries if the current operation is a breakpoint operation. If so, then in step 1044, the process determines if the absolute value of the location of the breakpoint less the current location is less than some breakpoint match value. If so, then the match flag is assigned as true in step 1028 and the match score is calculated using the weighting factor to match the break amount in step 1048. The process returns in step 1032.

A similar process for each record monitor begins in step 1050. If the monitor records are to be evaluated, then in step 1052, the process asks if the monitored variable is the same variable as in the stored scenario? If so, then the match flag is assigned to be TRUE as in step 1028 and the weighting factor ascribed to the variable is considered and the variable match is calculated and added to the score. The process then asks if the variable has changed in the record in step 1060. If so, then the process continues to step 1100 of FIG. 11.

Figure 11:
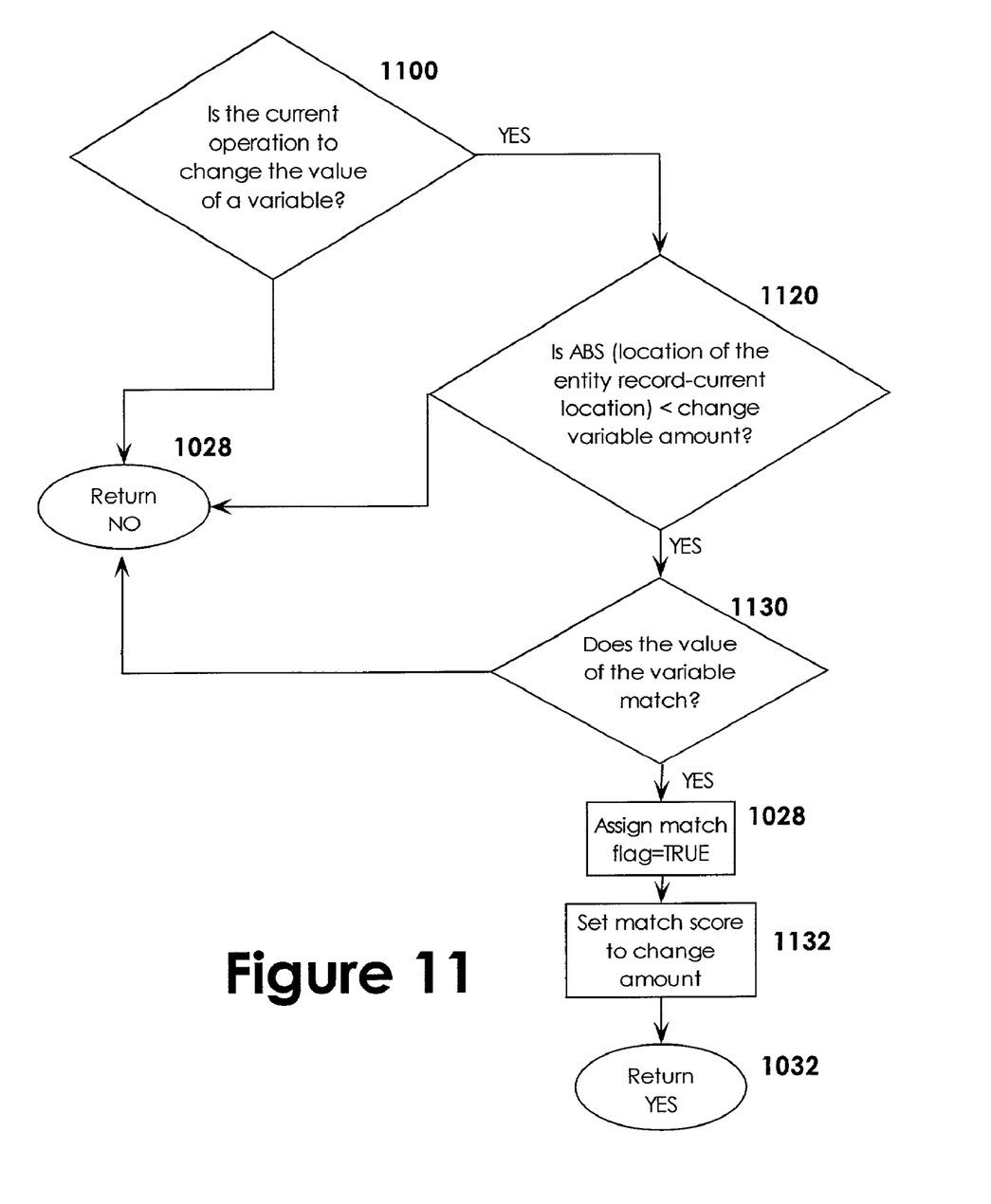

In FIG. 11, the process begins in step 1100 and asks if the current operation is one to change the value of a variable. If so, then, in step 1120, the process determines if the absolute value of the variable's location from the entity record less the current location of variable is less than a predetermined amount. If yes, then in step 1130, the process checks if the values of the variable is the same as the variable's value in the stored scenario. If so, then the match flag is set to TRUE in step 1028, and match score is updated in step 1132 and process returns in step 1032 to step 830. In this fashion, the user can compare the breakpoints, the operations, and the variables to determine if there are similar scenarios. One, of course, realizes that parameters other than or in addition to the breakpoints, operations, monitored expressions may be used to compare scenarios. These parameters are intended to be merely illustrative and not limitative.

After having executed a number of instructions and having set some basic breakpoints, the user can request the debugger to recall previously stored scenarios matching the current scenario undergoing debugging. The recalled scenarios may be displayed best match first.

Even if the user has not requested that previously stored scenarios be listed, the debugger incorporating features of the invention may remind the user a closely-related or near-matching scenario that was previously stored exists. Once the process described herein matches at least one scenario having matching scores within the threshold range for a match based on the breakpoints, steps, and monitored variables entered so far, The rest of the scenario attributes will also be indicated to the user. As a matter of fact, by pressing a "Set" button, the user could actually add those attributes to the current debug session. Of course, they may be indicated as Inactive by a different color or otherwise setting off the inactive breakpoints and monitors from the for the active ones.

In the debug environment program modifications do occur. Normally when a program is modified in this environment, a few lines of code are either inserted, deleted, or changed. One method to overcome minor changes to the program is to compute a cyclic redundancy coded (CRC) or a value for each event in the scenario that refers to a line of code. These events can include breakpoint locations and steps. If the line that a breakpoint was set at is not the same line, i.e., the CRC does not match, then the invention can see if by moving up or down a few lines, it can find the line with the matching CRC and adjust the scenario for the modified program. Cooperating source editors can also be used to identify where lines have been inserted or changed so debug scenarios can be maintained.

If, however, no preexisting scenarios match within the threshold value or some other value, the user may be asked if he/she wishes to store the scenario of the program undergoing debugging as a new scenario? If the answer is yes, the scenario of the current debugged program will be stored.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

The embodiments of the invention in which an exclusive property or privilege is claimed are defined as follows:

1. A computer implemented method for matching debug scenarios, the computer implemented method comprising:
   (a) determining what restorable debug entities comprise a current scenario of a computer program;
   (b) assigning an individual weight to each of the restorable debug entities;
   (c) given any two scenarios, comparing the individual weights of the restorable debug entities of each scenario to determine similarity beyond a threshold value of similarity between the scenarios;
   (d) if the comparison fails to determine a similarity beyond a threshold value of similarity, creating a new scenario; and
   (e) if the comparison determines a similarity beyond a threshold value of similarity, retrieving and displaying the scenarios and restorable debug entities to a user.

2. The computer implemented method of claim 1, further comprising:
   (a) establishing a new scenario if the scenarios are significantly different; and
   (b) storing the new scenario.

3. The computer implemented method of claim 1, further comprising:
   (a) recognizing that a previous scenario has been stored.

4. The computer implemented method of claim 3, further comprising:
   (a) restoring the previous scenario.

5. The computer implemented method of claim 4, further comprising:
   (a) modifying the current scenario by incorporating the debug entities of the previous scenario.

6. The computer implemented method of claim 4, further comprising:
   (a) modifying the previous scenario by incorporating the debug entities of an existing scenario.

7. The computer implemented method of claim 1, wherein the restorable debug entities comprise at least one breakpoint an/or a location of the at least one breakpoint in any two scenarios.

8. The computer implemented method of claim 7, wherein the at least one breakpoint is a line breakpoint.

9. The computer implemented method of claim 7, wherein the at least one breakpoint is an exit breakpoint.

10. The computer implemented method of claim 1, wherein the restorable debug entities comprise at least one operation and/or a location of the at least one operation in any two scenarios.

11. The computer implemented method of claim 1, wherein the restorable debug entities comprise at least one expression and/or a location and/or a value of the at least one expression in any two scenarios.

12. A computer implemented method for matching debug scenarios, the computer implemented method comprising:
   (a) determining that a scenario may comprise a plurality of restorable debug entities, each of which further comprises one or more of the following: at least one breakpoint and/or a location of the at least one breakpoint, at least one operation and/or a location of the at least one operation, at least one expression and/or a location and/or a value of the at least one expression;
   (b) assigning an individual weight to each of the restorable debug entities;
   (c) given a current scenario and at least one previous scenario, comparing the individual weights of the restorable debug entities of the current scenario to the individual weights of the restorable debug entities of at least one previous scenario to determine similarity beyond a threshold value of similarity between the scenarios;
   (d) if the comparison fails to determine a similarity beyond the threshold value of similarity, establishing and storing the current scenario;
   (e) if the comparison determines a similarity beyond the threshold value of similarity, recognizing that a previous scenario has been stored;
   (f) restoring the previous scenario; and
   (g) modifying the current scenario by incorporating the debug entities of the previous scenario and/or modifying the previous scenario by incorporating the debug entities of the current scenario.

13. A method of debugging a computer program, comprising the steps of:
   (a) monitoring a number of parameters that can be used to debug a computer program;
   (b) comparing at least one environment in which at Least one of the parameters are referenced during the execution of the computer program;
   (c) determining that the at least one environment is similar to an executing portion of the computer program because of a similarity of at least one of the parameters;
   (d) retrieving and displaying the at least one similar environment and the at least one and other parameters, if any, of the similar environment;
   (e) retrieving and displaying all of the similar environments and parameters of the similar environments wherein the parameters are similar beyond a threshold value of similarity.

14. The method of debugging of claim 13 wherein the step of determining further comprises:
   (a) weighting each of the parameters;
   (b) summing each of the weighted parameters;
   (c) determining if the sum of the weighted parameters is greater than or equal to the threshold value of similarity.

15. The method of debugging of claim 13, further comprising:
   (a) modifying the computer program as a result of the step of comparison.

16. The method of debugging of claim 13, further comprising:
   (a) modifying the at least one environment as a result of the step of comparing.

17. The method of debugging of claim 13, further comprising:
(a) storing that executing portion of the computer program as a new environment if the executing portion of the computer program is less than a threshold value of similarity.

18. An article of manufacture, comprising a data storage medium tangibly embodying a program of machine readable instructions executable by an electronic processing apparatus to perform method steps for operating an electronic processing apparatus, said method steps comprising the steps of:
(a) initiating a user interface to invoke execution of a computer program undergoing debugging;
(b) determining a plurality of debug entities to monitor during the execution of the computer program;
(c) monitoring the plurality of debug entities during execution of the computer program;
(d) recalling a plurality of scenarios having some of the same plurality of debug entities as those of the executing computer program;
(e) comparing the debug entities of the plurality of scenarios with the plurality of debug entities of the executing computer program;
(f) determining if any of the plurality of scenarios match the executing computer program based on the similarity of the debug entities;
(g) displaying those scenarios and debug entities of the displayed scenarios that math the debug entities of the executing computer program.

19. The data storage medium embodying a program of machine readable instructions executable by an electronic processing apparatus to perform method steps of claim 18, further comprising the method steps of:
(a) modifying the executing computer program.

20. The data storage medium embodying a program of machine readable instructions executable by an electronic processing apparatus to perform method steps of claim 18, further comprising the method steps of:
(a) storing the executing computer program as a new scenario if no matching scenarios exist.

21. A computer program product for matching debug scenarios, the computer program product comprising:
a computer usable data storage medium having computer usable program code tangibly embodied therein, the computer usable program code comprising:
computer usable program code for calling a computer program;
computer usable program code for setting a plurality of debug parameters to monitor during execution of the computer program;
computer usable program code for storing a plurality of scenarios of previously executed computer programs, each of said scenarios having at least one debug parameter;
computer usable program code for comparing the debug parameters of the computer program during execution with the debug parameters of the previously executed computer programs;
computer usable program code for ascertaining whether the computer program is similar to any of the previously executed computer programs;
computer usable program code for displaying the previously executed computer programs that are similar to the computer program;
computer usable program code for modifying the computer program in accordance with any of the similar previously executed computer programs; and
computer usable program code for storing the computer program and its debug parameters.

\* \* \* \* \*